United States Patent
Pan et al.

(10) Patent No.: US 9,717,092 B2
(45) Date of Patent: Jul. 25, 2017

(54) METHOD AND APPARATUS FOR ALLOCATING RESOURCES FOR DEVICE-TO-DEVICE (D2D) COMMUNICATION IN A WIRELESS COMMUNICATION SYSTEM

(71) Applicant: INNOVATIVE SONIC CORPORATION, Taipei (TW)

(72) Inventors: Li-Te Pan, Taipei (TW); Richard Lee-Chee Kuo, Taipei (TW); Wei-Yu Chen, Taipei (TW)

(73) Assignee: INNOVATIVE SONIC CORPORATION, Taipei (TW)

( * ) Notice: Subject to any disclaimer, the term of this patent is extended or adjusted under 35 U.S.C. 154(b) by 124 days.

(21) Appl. No.: 14/676,438

(22) Filed: Apr. 1, 2015

(65) Prior Publication Data

US 2015/0289253 A1  Oct. 8, 2015

Related U.S. Application Data

(60) Provisional application No. 61/974,596, filed on Apr. 3, 2014.

(51) Int. Cl.
*H04W 72/04* (2009.01)
*H04W 76/02* (2009.01)

(52) U.S. Cl.
CPC ..... *H04W 72/048* (2013.01); *H04W 72/0406* (2013.01); *H04W 72/0413* (2013.01); *H04W 76/021* (2013.01); *H04W 76/023* (2013.01)

(58) Field of Classification Search
None
See application file for complete search history.

(56) References Cited

U.S. PATENT DOCUMENTS

| 2014/0057670 A1* | 2/2014 | Lim | H04W 8/005 455/509 |
| 2015/0023267 A1* | 1/2015 | Lim | H04L 1/1854 370/329 |
| 2016/0227493 A1* | 8/2016 | Kwak | H04W 52/50 |

FOREIGN PATENT DOCUMENTS

WO  2014014323 A1  1/2014

OTHER PUBLICATIONS

3GPP TSG RAN WG2 Meeting #84, Ljubljana, Slovenia, Oct. 11-15, 2013 (R2-134062).

(Continued)

*Primary Examiner* — Anh Ngoc Nguyen
(74) *Attorney, Agent, or Firm* — Blue Capital Law Firm, P.C.

(57) ABSTRACT

A method and apparatus for allocating resources for D2D communication are disclosed. The method includes a WCN allocating dedicated resource for a first D2D data session and common resource for a second D2D data session in a user equipment (UE), wherein the first D2D data session and the second D2D data session are active simultaneously in the UE. The method could also include the WCN receiving a corresponding request message from the UE for establishing each D2D data session. The method could further include the WCN transmitting a response message to the UE in response to reception of the corresponding request message, wherein the response message includes resource information that indicates which type of resource is allocated for each D2D data session.

36 Claims, 8 Drawing Sheets

(56) References Cited

OTHER PUBLICATIONS

3GPP TSG-RAN WG1#76bis, Mar. 31-Apr. 4, 2014, Shenzhen, China (R1-141451).
3GPP TSG-RAN WG3 Meeting #81, Barcelona, Spain, Aug. 19-23, 2013 (R3-131457).
Search Report on corresponding EP Patent Application No. 15162365.9 dated Jul. 20, 2015.

* cited by examiner

METHOD AND APPARATUS FOR ALLOCATING RESOURCES FOR DEVICE-TO-DEVICE (D2D) COMMUNICATION IN A WIRELESS COMMUNICATION SYSTEM

CROSS-REFERENCE TO RELATED APPLICATIONS

The present Application claims the benefit of U.S. Provisional Patent Application Ser. No. 61/974,596 filed on Apr. 3, 2014, the entire disclosure of which is incorporated herein by reference.

FIELD

This disclosure generally relates to wireless communication networks, and more particularly, to a method and apparatus for allocating resources for D2D communication in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus for allocating resources for D2D communication are disclosed. The method includes a wireless communication network (WCN) allocating dedicated resource for a first D2D data session and common resource for a second D2D data session in a user equipment (UE), wherein the first D2D data session and the second D2D data session are active simultaneously in the UE. The method could also include the WCN receiving a corresponding request message from the UE for establishing each D2D data session. The method could further include the WCN transmitting a response message to the UE in response to reception of the corresponding request message, wherein the response message include resource information that indicates which type of resource is allocated for each D2D data session.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including TR 36.843 v12.0.0, "Study on LTE device to device proximity services; Radio aspects (Release 12)"; TS 36.321 v10.5.0, "E-UTRA; Medium Access Control (MAC) protocol specification (Release 10)"; TR 23.703 v1.0.0, "Study on architecture enhancements to support Proximity-based Services (ProSe) (Release 12)"; R2-140716, "Miscellaneous Open Issues of 1: M D2D broadcast communication", Qualcomm Incorporated, Samsung; R2-140625, "Resource allocation for D2D transmitters in coverage", Ericsson; R1-140778, "On scheduling procedure for D2D", Ericsson; RAN2#85 minute held in Prague, Czech Republic Feb. 10-14, 2014; TS 25.331 v12.0.0, "RRC; Protocol specification (Release 12)"; SP-110638, "WID on Proposal for a study on Proximity-based Services"; S2-140520, "Direct discovery procedures", Qualcomm Incorporated. The standards and documents listed above are hereby expressly incorporated by reference in their entirety.

Figure 1:
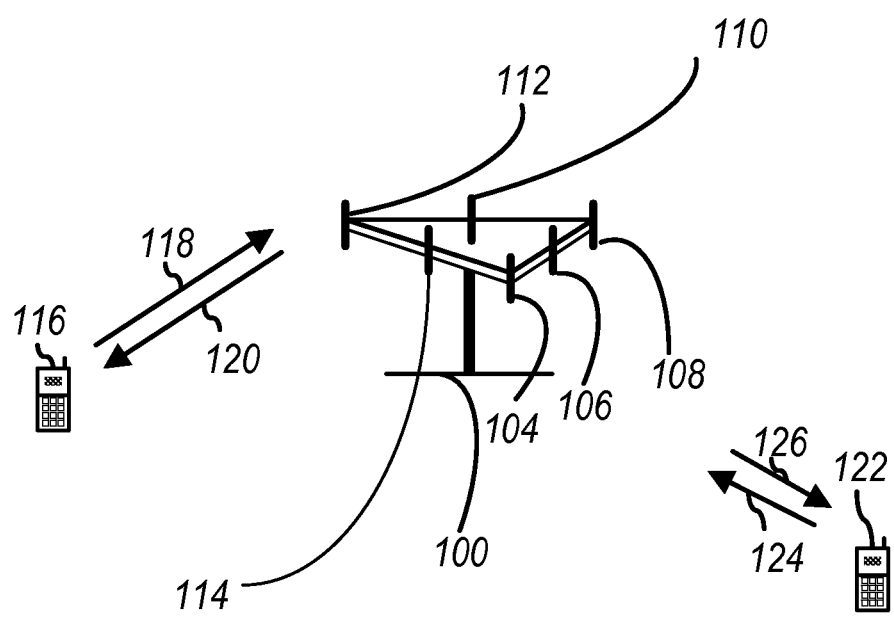
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
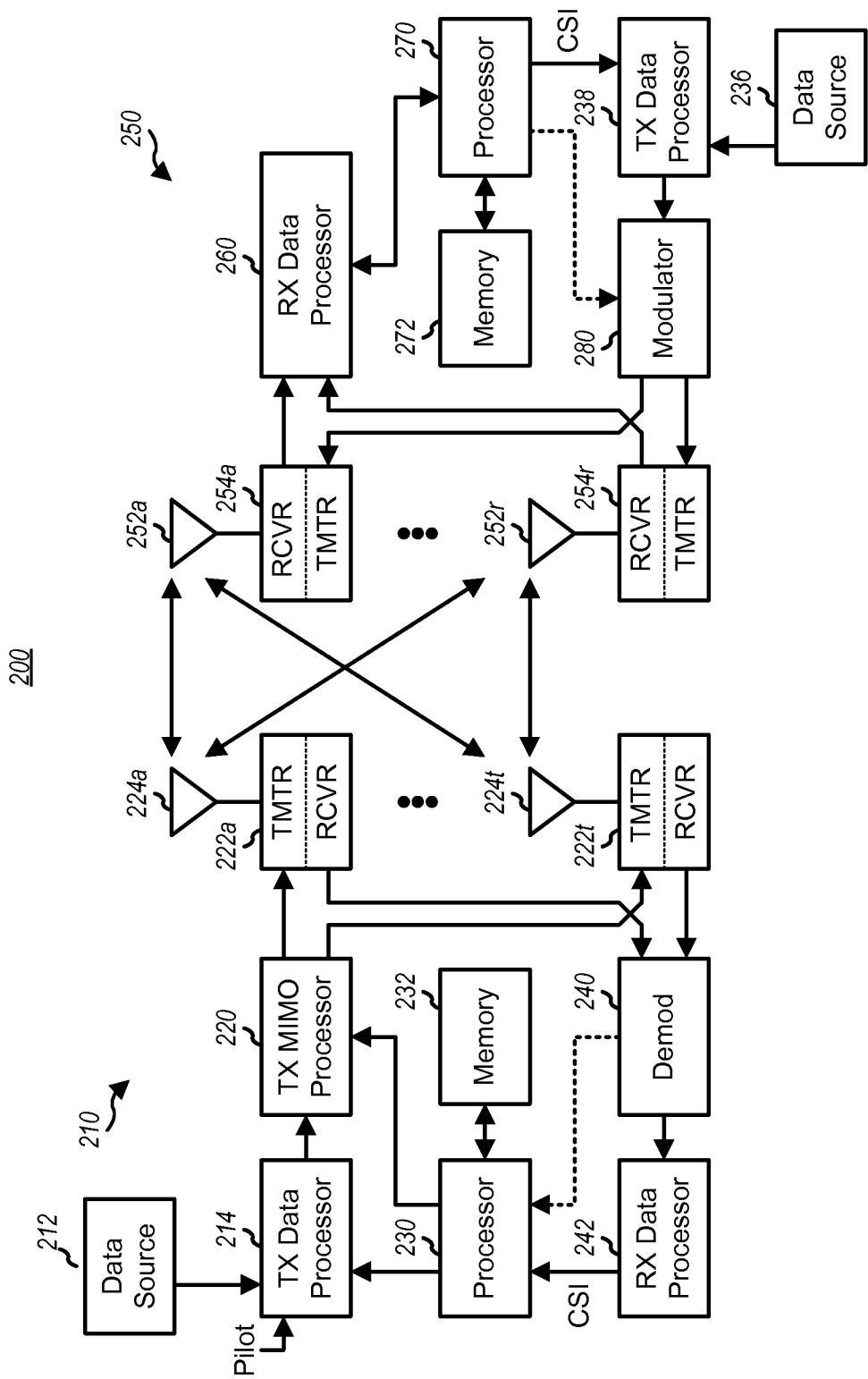
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
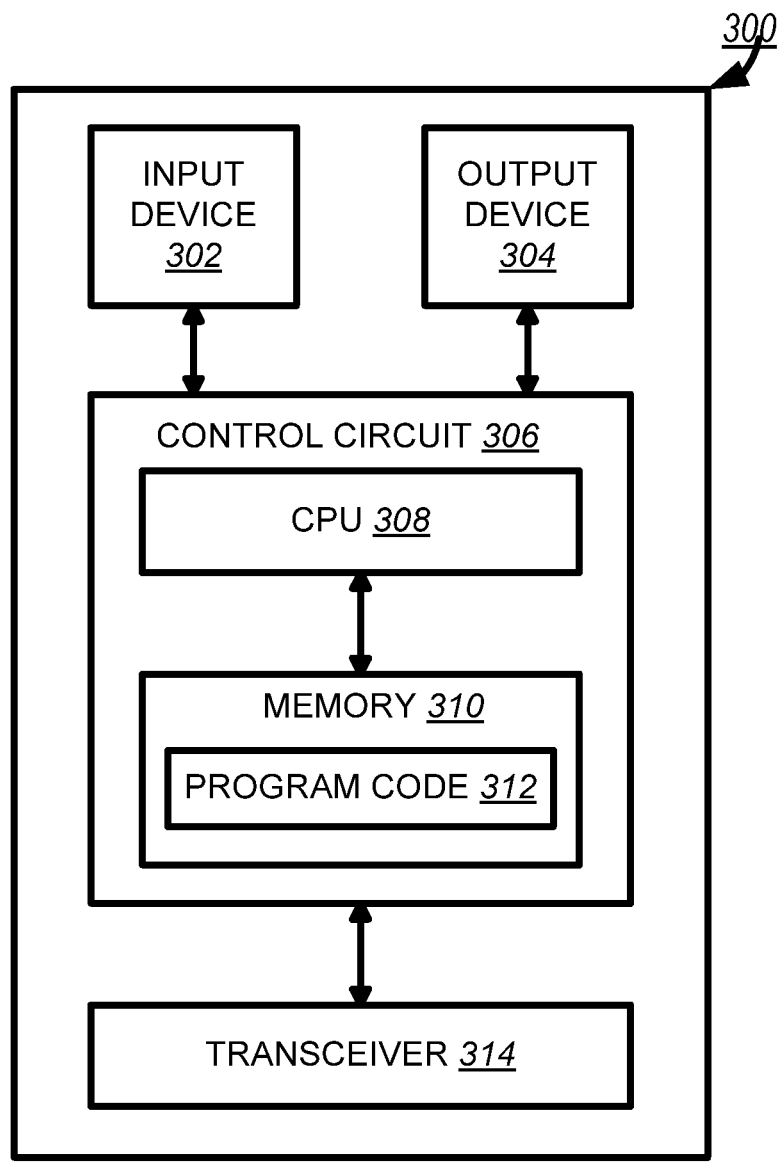
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
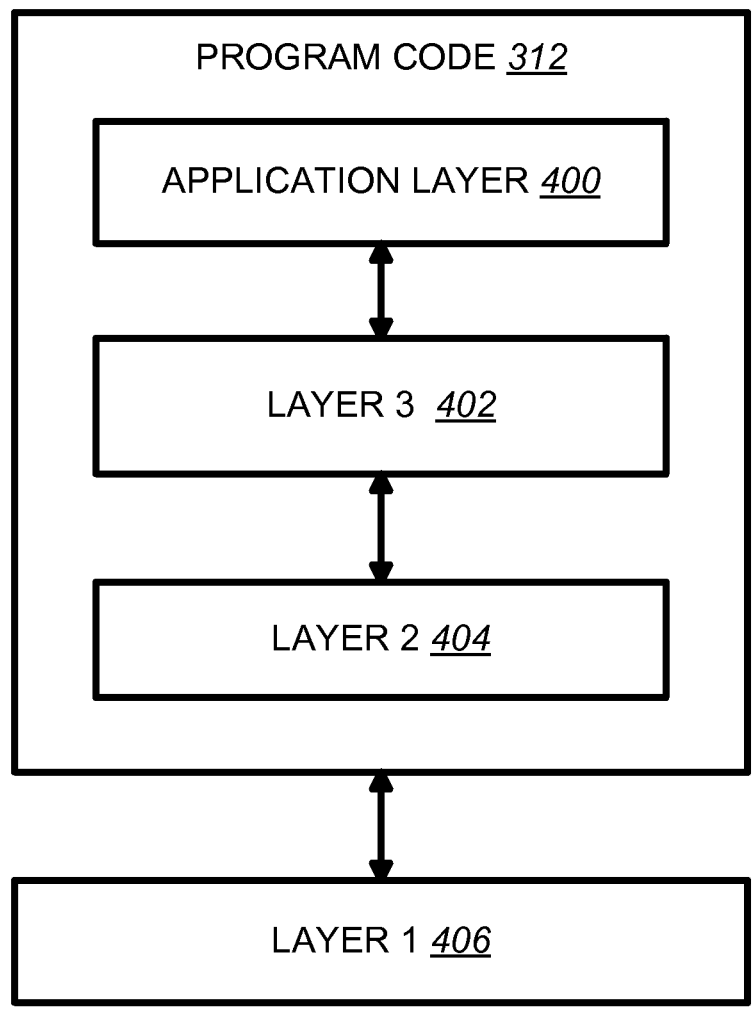
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE or LTE-A systems, the Layer 2 portion may include a Radio Link Control (RLC) layer and a Medium Access Control (MAC) layer. The Layer 3 portion may include a Radio Resource Control (RRC) layer.

3GPP SP-110638 proposes a new study item on Proximity-based Services (ProSe). As discussed in 3GPP SP-110638, the justification and objective of the study item are as follows:

3 Justification

Proximity-based applications and services represent a recent and enormous socio-technological trend. The principle of these applications is to discover instances of the applications running in devices that are within proximity of each other, and ultimately also exchange application-related data. In parallel, there is interest in proximity-based discovery and communications in the public safety community.

Current 3GPP specification are only partially suited for such needs, since all such traffic and signalling would have to be routed in the network, thus impacting their performance and adding un-necessary load in the network. These current limitations are also an obstacle to the creation of even more advanced proximity-based applications.

In this context, 3GPP technology, has the opportunity to become the platform of choice to enable proximity-based discovery and communication between devices, and promote a vast array of future and more advanced proximity-based applications.

4 Objective

The objective is to study use cases and identify potential requirements for an operator network controlled discovery and communications between devices that are in proximity, under continuous network control, and are under a 3GPP network coverage, for:
1. Commercial/social use
2. Network offloading
3. Public Safety
4. Integration of current infrastructure services, to assure the consistency of the user experience including reachability and mobility aspects Additionally, the study item will study use cases and identify potential requirements for
5. Public Safety, in case of absence of EUTRAN coverage (subject to regional regulation and operator policy, and limited to specific public-safety designated frequency bands and terminals)

Use cases and service requirements will be studied including network operator control, authentication, authorization, accounting and regulatory aspects.

The study does not apply to GERAN or UTRAN.

Furthermore, according to 3GPP TR 36.843, a UE (User Equipment) can operate D2D communication in two modes, Mode 1 and Mode 2, as follows:

9.1.2 Resource Allocation

From a transmitting UE's perspective, a UE can operate in two modes for resource allocation:
Mode 1: eNodeB or Release-10 relay node schedules the exact resources used by a UE to transmit direct data and direct control information
FFS: if semi-static resource pool restricting the available resources for data and/or control is needed
Mode 2: a UE on its own selects resources from resource pools to transmit direct data and direct control information
FFS if the resource pools for data and control are the same
FFS: if semi-static and/or pre-configured resource pool restricting the available resources for data and/or control is needed D2D communication capable UE shall support at least Mode 1 for in-coverage D2D communication capable UE shall support Mode 2 for at least edge-of-coverage and/or out-of-coverage 3GPP TR 36.843 describes the resource allocation of data transmission and scheduling assignment transmission supporting Model 1 and Model 2, wherein the resource of data transmission in Model 1 is dedicated resource and the resource of data transmission in Mode 2 is contention-based resource or common resource as follows:

9.2.3.2 Radio Resource Allocation

UEs in-coverage and out-of-coverage need to be aware of a resource pool (time/frequency) for D2D communication reception.

All UEs (Mode 1 ("scheduled") and Mode 2 ("autonomous")) are provided with a resource pool (time and frequency) in which they attempt to receive scheduling assignments.

Editor's Note: It is FFS how the resource pool is configured/provided to UEs in or out of coverage. (e.g. pre-configured; provided by eNodeB in SIB; forwarded by UEs in coverage to UEs out of coverage)

In Mode 1, a UE requests transmission resources from an eNodeB. The eNodeB schedules transmission resources for transmission of scheduling assignment(s) and data.

The UE sends a scheduling request (D-SR or RA) to the eNodeB followed by a BSR based on which the eNodeB can determine that the UE intends to perform a D2D transmission as well as the required amount resources.

Editor's Note: It is FFS how the eNodeB indicates the transmission resources to the UE.

In Mode 1, the UE needs to be RRC Connected in order to transmit D2D communication.

For Mode 2, UEs are provided with a resource pool (time and frequency) from which they choose resources for transmitting D2D communication.

Editor's Note: It is FFS for Mode 2, UEs in the "edge of coverage", obtain the transmission resource pool by the eNB (e.g. SIB signalling).

Editor's Note: It is FFS for For Mode 2, UEs out of coverage how they obtain the transmission resource pool (e.g. pre-configured; from other UEs; . . . ).

The eNodeB controls whether UE may apply Mode 1or Mode 2 transmission. Details FFS.

The RAN2#85 meeting minutes capture the following agreements for D2D communication:

Agreements

1 All UEs (Mode 1 ("scheduled") and Mode 2 ("autonomous")) are provided with a resource pool (time and frequency) in which they attempt to receive scheduling assignments.

FFS how the resource pool is configured/provided to UEs in or out of coverage. (e.g. pre-configured; provided by eNB in SIB; forwarded by UEs in coverage to UEs out of coverage)

2 In Mode 1, a UE requests transmission resources from an eNB. The eNB schedules transmission resources for transmission of scheduling assignment(s) and data.

2a In Mode 1, the UE sends a scheduling request (D-SR or RA) to the eNB followed by a BSR based on which the eNB can determine that the UE intends to perform a D2D transmission as well as the required amount resources.

2b In Mode 1, it is FFS how the eNB indicates the transmission resources to the UE.

2c In Mode 1, the UE needs to be RRC Connected in order to transmit D2D communication.

[ . . . ]

3a The eNB controls whether UE may apply Mode 1 or Mode 2 transmission. Details FFS.

[ . . . ]

3GPP S2-140520 generally describes ProSe Application ID and ProSe Application Code for use in discovery as follows:

4.6.2 Identifiers for Direct Discovery 4.6.2.1 ProSe Application ID

The ProSe Application ID is an identity used for direct discovery, identifying application related information for the ProSe enabled UE. Each ProSe Application ID is globally unique and unambiguously identifies a service across the 3GPP PLMNs.

For open discovery, the ProSe Application ID is called Public ProSe Application ID. The Public ProSe Application ID can be PLMN-specific or country specific or global.

Each Public ProSe Application ID is composed of the following parts:

a. ProSe Application ID Name is described in its entirety by a data structure that could be a tree data structure characterized by different levels e.g., broad-level business category (Level0)/business sub-category (Level1)/business name (Level2)/shop ID (Level3). For the purpose of presentation, a ProSe Application ID Name is usually displayed as a string of labels in which the labels represent hierarchical levels.

b. ProSe Application ID Operator Identifier that corresponds to the PLMN id that assigned the ProSe Application ID Name NOTE: If the public ProSe Application ID is country specific then the Mobile Network Code (MNC) of the ProSe Application ID Operator Identifier is wild carded. If global, both the MCC and MNC are wild carded.

In case of open discovery:

when the "announcing" UE wants to indicate to the ProSe Function what is interested to announce, in order to be assigned a ProSe Application Code it contains in the discovery request a Public ProSe Application ID that indicates its interest when the "monitoring" UE wants to indicate to the ProSe Function what to monitor, it contains in the discovery request the full or a subset of the public ProSe Application ID e.g. it can contain 2 out of the n levels of the full Public ProSe Application ID NOTE: The ProSe Application ID Name tree data structure is not expected to change often.

4.6.2.2 ProSe Application Code

The ProSe Application Code is contained in the message that is actually transmitted "over the air" (on PC5) by a UE engaged in the ProSe direct discovery procedure.

Each ProSe Application Code is composed of the following parts:

a. A temporary identity that corresponds to the ProSe Application ID Name. Given the tree structure associated with public ProSe Application ID, each is associated with a different temporary identity that is built appending a new piece of identifier (specific to that node) to the identifier inherited by the predecessor node: this allows partial matching at the UE side using a mask, making more effective and flexible the filtering of the received temporary identity in a monitoring UE.

b. The PLMN id that assigned the ProSe Code, i.e. Mobile Country Code (MCC) and Mobile Network Code (MNC)

c. The ProSe Function Identifier of the Prose Function that has assigned the ProSe Code.

Editor's Note: The need for ProSe Function Identifier as part of the ProSe Application Code is FFS.

NOTE: In this release of the specification the ProSe Application Code is always assigned by a ProSe Function in HPLMN.

A ProSe Application Code is allocated per "announcing" UE and per application and has an associated validity timer that runs both in the ProSe Function and in the UE.

The ProSe Function may decide at any time to replace a previously allocated ProSe Application Code providing the UE with a new ProSe Application Code, where the temporary UE specific identifier is changed. Replacing a ProSe Code resets the corresponding validity timer both in the ProSe Function and in the UE.

Editor's Note: Each sub-section specifies a new identifier required for ProSe.

3GPP TR 23.703 captures some normative works for D2D communication as follows:

8.2 Conclusions for ProSe One-to-Many Communication Decentralized Mode

Normative work needs to proceed as follows:

[ . . . ]

There is no QoS support apart from priority handling;

3GPP R2-140716 proposes that UE can handle prioritization using local function if there is no QoS (Quality of Service) support for D2D communication as follows:

SA2 has made following agreements for 1: M broadcast communication TR 23.703 section 8.2 [2]:

There is no QoS support apart from priority handling;

As per this agreement there is no QoS required 1: M broadcast communication in Rel-12; however prioritization can be handled by UE using local function e.g. voice packets are prioritised compared to data packet at MAC. As a consequence we don't need to have parameters related to QoS or prioritization of traffic.

The MAC specification, 3GPP TS 36.321, specifies the procedure of Buffer Status Reporting and Buffer Status Report (BSR) MAC control elements as follows:

5.4.5 Buffer Status Reporting

The Buffer Status reporting procedure is used to provide the serving eNB with information about the amount of data available for transmission in the UL buffers of the UE. RRC controls BSR reporting by configuring the two timers periodicBSR-Timer and retxBSR-Timer and by, for each logical channel, optionally signalling logicalChannelGroup which allocates the logical channel to an LCG [8].

For the Buffer Status reporting procedure, the UE shall consider all radio bearers which are not suspended and may consider radio bearers which are suspended.

A Buffer Status Report (BSR) shall be triggered if any of the following events occur:

UL data, for a logical channel which belongs to a LCG, becomes available for transmission in the RLC entity or in the PDCP entity (the definition of what data shall be considered as available for transmission is specified in [3] and [4] respectively) and either the data belongs to a logical channel with higher priority than the priorities of the logical channels which belong to any LCG and for which data is already available for transmission, or there is no data available for transmission for any of the logical channels which belong to a LCG, in which case the BSR is referred below to as "Regular BSR";

UL resources are allocated and number of padding bits is equal to or larger than the size of the Buffer Status Report MAC control element plus its subheader, in which case the BSR is referred below to as "Padding BSR";

retxBSR-Timer expires and the UE has data available for transmission for any of the logical channels which belong to a LCG, in which case the BSR is referred below to as "Regular BSR";

periodicBSR-Timer expires, in which case the BSR is referred below to as "Periodic BSR".

For Regular and Periodic BSR:
if more than one LCG has data available for transmission in the TTI where the BSR is transmitted: report Long BSR;
else report Short BSR.

For Padding BSR:
if the number of padding bits is equal to or larger than the size of the Short BSR plus its subheader but smaller than the size of the Long BSR plus its subheader:
if more than one LCG has data available for transmission in the TTI where the BSR is transmitted: report Truncated BSR of the LCG with the highest priority logical channel with data available for transmission;
else report Short BSR.
else if the number of padding bits is equal to or larger than the size of the Long BSR plus its subheader, report Long BSR.

If the Buffer Status reporting procedure determines that at least one BSR has been triggered and not cancelled:
if the UE has UL resources allocated for new transmission for this TTI:
instruct the Multiplexing and Assembly procedure to generate the BSR MAC control element(s);
start or restart periodicBSR-Timer except when all the generated BSRs are Truncated BSRs;
start or restart retxBSR-Timer.
else if a Regular BSR has been triggered:
if an uplink grant is not configured or the Regular BSR was not triggered due to data becoming available for transmission for a logical channel for which logical channel SR masking (logicalChannelSR-Mask) is setup by upper layers:
a Scheduling Request shall be triggered.
[ . . . ]

6.1.3.1 Buffer Status Report MAC Control Elements

Buffer Status Report (BSR) MAC control elements consist of either:
Short BSR and Truncated BSR format: one LCG ID field and one corresponding Buffer Size field (FIG. 6.1.3.1-1); or
Long BSR format: four Buffer Size fields, corresponding to LCG IDs #0 through #3 (FIG. 6.1.3.1-2).

The BSR formats are identified by MAC PDU subheaders with LCIDs as specified in table 6.2.1-2.

The fields LCG ID and Buffer Size are defined as follow:
LCG ID: The Logical Channel Group ID field identifies the group of logical channel(s) which buffer status is being reported. The length of the field is 2 bits;
Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. If extendedBSR-Sizes is not configured, the values taken by the Buffer Size field are shown in Table 6.1.3.1-1. If extendedBSR-Sizes is configured, the values taken by the Buffer Size field are shown in Table 6.1.3.1-2.

Figure 5:
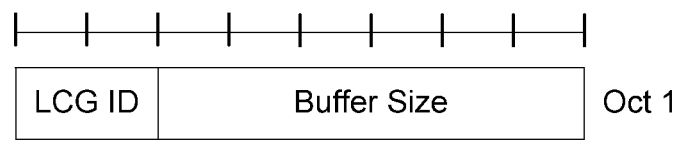
FIG. 5 is a reproduction of FIG. 6.1.3.1-1 of 3GPP TS 36.321.
Figure 6:
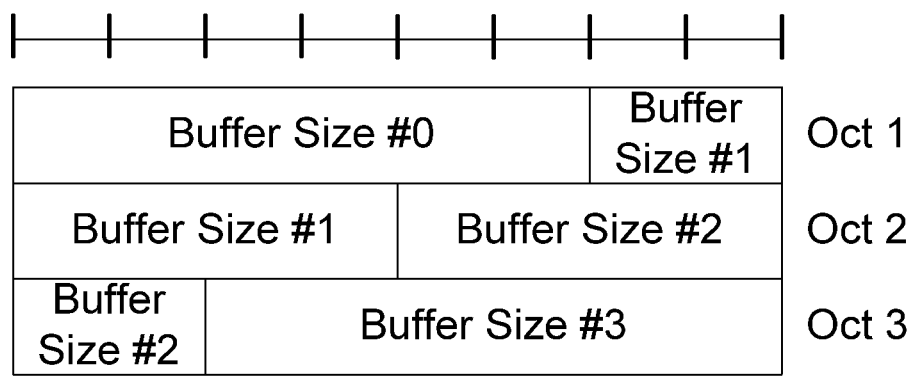
FIG. 6 is a reproduction of FIG. 6.1.3.1-2 of 3GPP TS 36.321.

[FIG. 6.1.3.1-1 entitled "Short BSR and Truncated BSR MAC control element" has been reproduced as FIG. 5]
[FIG. 6.1.3.1-2 entitled "Long BSR MAC control element" has been reproduced as FIG. 6]

The MAC specification, 3GPP TS 36.321, also specifies the procedure of Scheduling Request.

5.4.4 Scheduling Request

The Scheduling Request (SR) is used for requesting UL-SCH resources for new transmission.

When an SR is triggered, it shall be considered as pending until it is cancelled. All pending SR(s) shall be cancelled and sr-ProhibitTimer shall be stopped when a MAC PDU is assembled and this PDU includes a BSR which contains buffer status up to (and including) the last event that triggered a BSR (see subclause 5.4.5), or when the UL grant(s) can accommodate all pending data available for transmission.

If an SR is triggered and there is no other SR pending, the UE shall set the SR_COUNTER to 0.

As long as one SR is pending, the UE shall for each TTI:
if no UL-SCH resources are available for a transmission in this TTI:
if the UE has no valid PUCCH resource for SR configured in any TTI: initiate a Random Access procedure (see subclause 5.1) on the PCell and cancel all pending SRs;
[ . . . ]

3GPP R1-140778 introduces a concept of validity timer for Scheduling Assignments (SA) announcement as follows:

3. Scheduling Assignments (SAs)

An SA is a compact (low-payload) message containing control information, e.g., pointer(s) to time-frequency resources for the corresponding data transmissions. The contents of SAs (i.e., the actual data scheduling) may be decided autonomously by the broadcasting node (e.g., when out-of-coverage) or by the network (e.g., when in coverage or in partial coverage). Each SA carries also an L1 SA identity [5] to allow the receiving UE to only decode the data that is relevant for this UE. Example contents of an SA are provided in Table 3, where Option 1 and Option 2 are shown (see [4] for simulation results for the two options; see [5] for more details on the two options).

[ . . . ]

SAs are transmitted periodically (e.g., 40-160 ms periodicity) by the D2D transmitters broadcasting data, as long as there are broadcast data (associated with the SAs) that the UE needs to transmit and the SA validity period has not expired. SAs are transmitted on pre-defined time-frequency resources known to receivers (e.g. to benefit the receiver DRX), where the pre-defined resources are subframes also containing D2DSSs. Redundant SAs may also be transmitted to increase SA detection probability. Hopping may be used for the retransmissions to achieve diversity.

In a UMTS (Universal Mobile Telecommunications System) system (as discussed in 3GPP TS 25.331), the RRC (Radio Resource Control) states of a UE include a CELL_FACH state and a CELL_DCH state. In the CELL_FACH state, contention-based resources are allocated to a UE for uplink transmissions. For each time there is data for transmission, the UE shall perform a random access (RA) procedure to request resources from the network (NW). In the CELL_DCH state, the UE uses the dedicated resources configured by the NW for data transmissions. The NW determines which state a UE should be in based on the QoS requirement of the active service(s) in the UE. For instance, the NW would select the CELL_DCH state for the UE if the QoS requirement is strict; otherwise, the CELL_FACH state would be selected. Thus, in UMTS either contention-based resources or dedicated resources are allocated to a UE.

In legacy LTE system, contention-based resources are used by a UE when dedicated resources are not available according to the MAC specification (3GPP TS 36.321). In both UMTS system and legacy LTE (Long Term Evolution) system, contention-based resources and dedicated resources are not used by a UE simultaneously. 3GPP TR 23.703 indicates that it was agreed that there is no QoS support for 1:M D2D communication apart from priority handling. For public safety use cases, the resources could be allocated assuming the highest QoS level so that QoS could always be satisfied. But, this is not efficient in terms of resource usage for commercial D2D use cases because different services have different QoS requirements and requires different amounts of resources. Thus, QoS of a triggered D2D service should be provided to the NW and the D2D resources are then allocated according to the QoS.

Here are two general examples for NW to allocate resources based on the QoS:
(1) For voice calls, semi-persistent dedicated resources are preferred due to strict QoS requirement.
(2) Traffic of interactive messaging is bursty and its latency requirement is less tight. Thus, contention-based D2D resources could be used.

If both a voice call and an interactive messaging are active in a UE, the eNB could allocate dedicated D2D resources to the UE for voice call and allocate contention-based D2D resources for interactive messaging. The benefit is more dedicated resources could be reserved for services with high QoS as compared to allocating more dedicated resources to these two services. Because the traffic of interactive messaging is bursty, the extra dedicated resources allocated for the interactive messaging would not be used most of the time.

Figure 7:
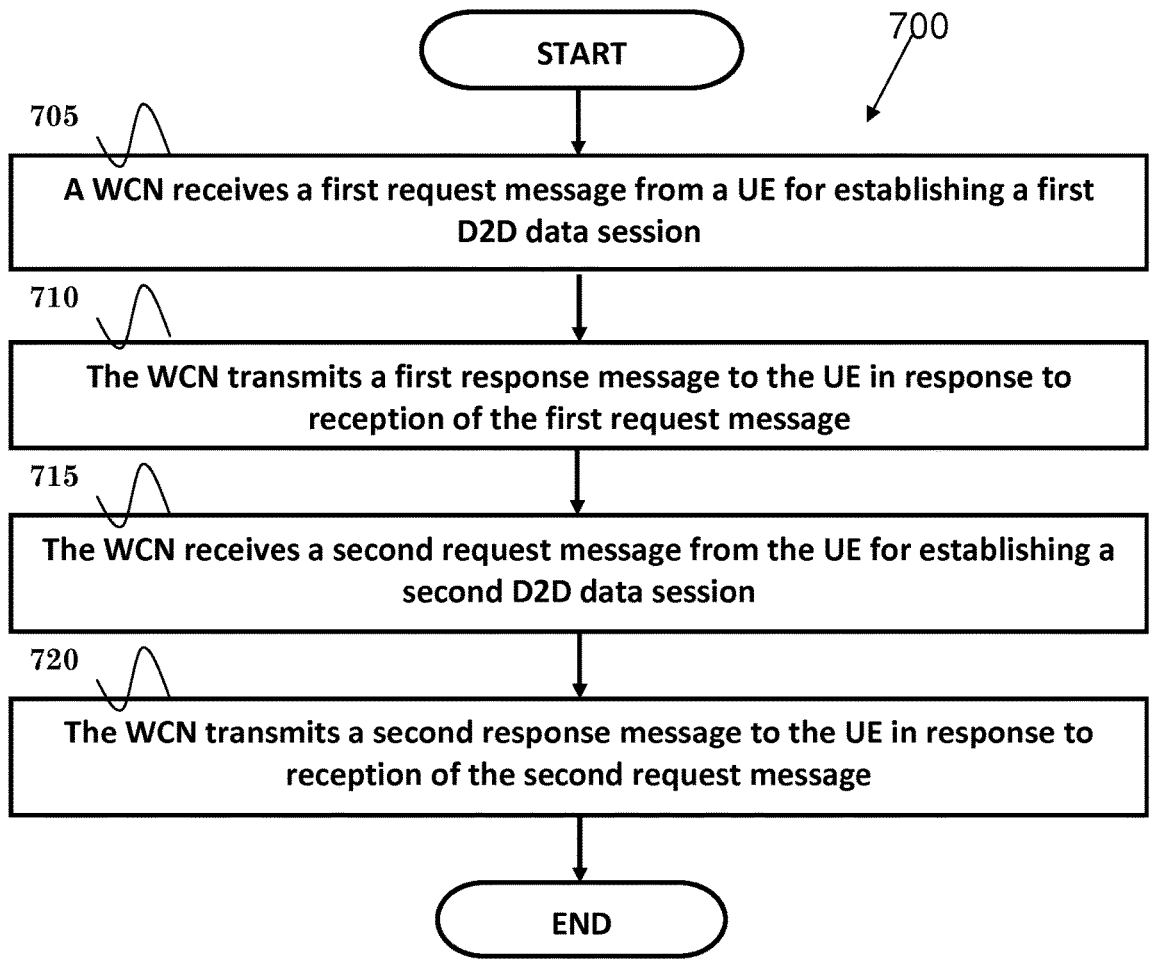
FIG. 7 is a flow chart according to one exemplary embodiment.

FIG. 7 is a flow chart 700 illustrating an exemplary signal flow according to one embodiment from the perspective of a wireless communication network (WCN). In one embodiment, as shown in step 705, the WCN receives a first request message from a UE for establishing a first D2D data session. The first request message may include, without limitation, one or more of the following information:
  an application identity used by the other UE in the first D2D data session;
  a ProSe Application Code used by the other UE in the first D2D data session;
  an identity of the other UE in the first D2D data session; and/or
  a service type or a QoS (Quality of Service) of the first D2D data session.
For example, the first request message may include an identity of another UE associated with the first D2D data session.

In one embodiment, as shown in step 710, the WCN transmits a first response message to the UE in response to reception of the first request message, wherein the first response message includes resource information that indicates dedicated resource for the first D2D data session. More specifically, the first response message could include a configuration of the dedicated resource, and/or a configuration of scheduling assignment (SA). In particular, the SA could be associated with a validity time.

In one embodiment, as shown in step 715, the WCN receives a second request message from the UE for establishing a second D2D data session. More specifically, the second request message could include, without limitation, one or more of the following information:
  an application identity used by the other UE in the second D2D data session;
  a ProSe Application Code used by the other UE in the second D2D data session;
  an identity of the other UE in the second D2D data session; and/or
  a service type or a QoS (Quality of Service) of the second D2D data session.
For example, the second request message may include an identity of another UE associated with the second D2D data session.

In one embodiment, as shown in step 720, the WCN transmits a second response message to the UE in response to reception of the second request message, wherein the second response message includes resource information that indicates at least one common resource pool for the second D2D data session. The second response message could include a configuration of scheduling assignment (SA). More specifically, the SA could be associated with a validity time.

In one embodiment, the resource information could be an indicator indicating either dedicated resource or common resource is allocated for a D2D data session. More specifically, the dedicated resource is a resource in a dedicated resource pool. In particular, the dedicated resource may be associated with a validity time. More specifically, the resource is radio resource that could include time resource and/or frequency resource.

As described above, the WCN allocates dedicated resource to the UE for the first D2D data session and allocates common resource to the UE for the second D2D data session before the end of the first D2D data session. In another embodiment, the WCN allocates common resource to the UE for the first D2D data session and allocates dedicated resource to the UE for the second D2D data session before the end of the first D2D data session.

Referring back to FIGS. 3 and 4, the device 300 includes a program code 312 stored in memory 310 of the WCN. The CPU 308 could execute program code 312 to enable the WCN to allocate dedicated resource to a UE for a first D2D data session, and to allocate common resource to the UE for a second D2D data before the first D2D data session ends. Furthermore, the CPU 308 could execute program code 312 to enable the WCN to receive a request message from the UE for establishing a D2D data session. The CPU 308 could also execute program code 312 to enable the WCN to transmit a response message to the UE in response to reception of the request message, wherein the response message includes resource information that indicates which type of resource is allocated for the D2D data session.

In addition, the CPU 308 could execute the program code 312 to perform all of the above-described actions and steps or others described herein.

Figure 8:
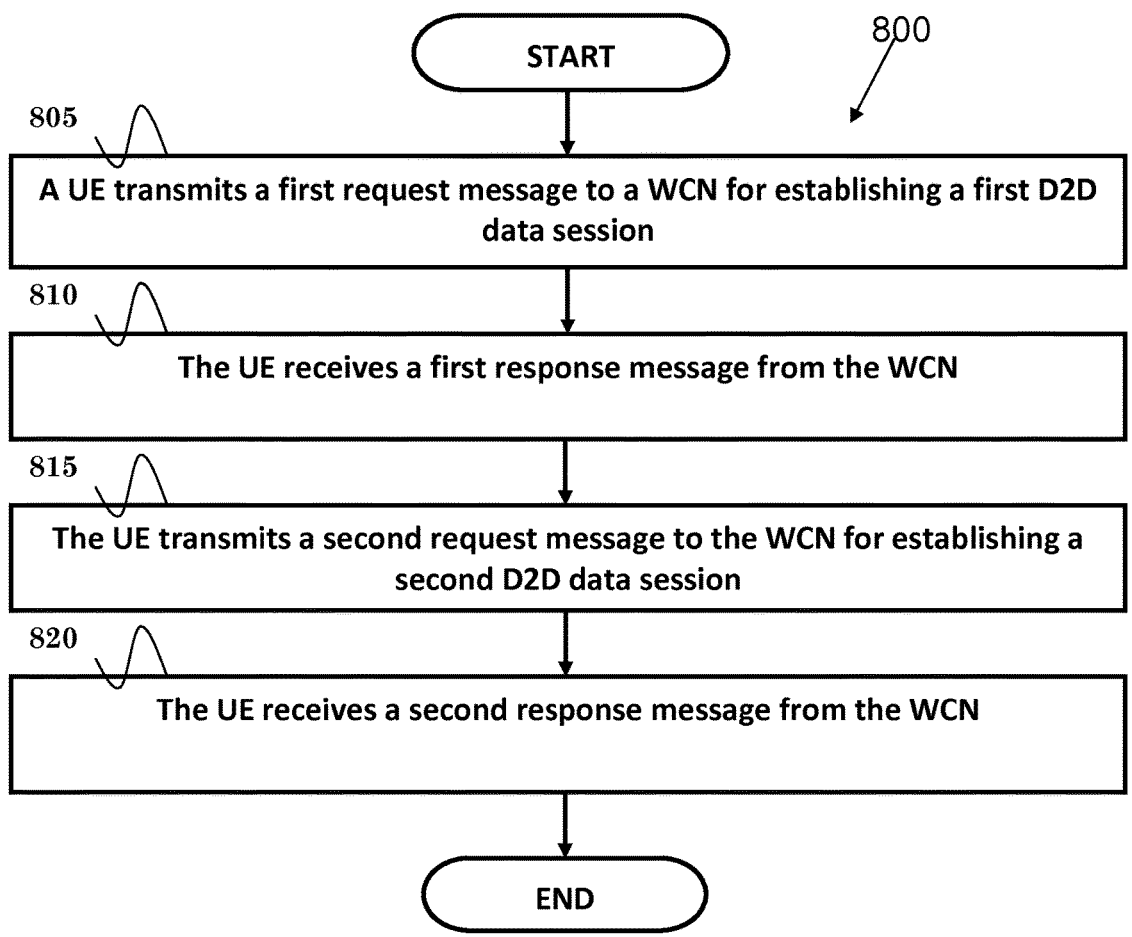
FIG. 8 is a flow chart according to one exemplary embodiment.

FIG. 8 is a flow chart 800 in accordance with one exemplary embodiment from the perspective of a UE. In one embodiment, as shown in step 805, the UE transmits a first request message to a wireless communication network (WCN) for establishing a first D2D data session. The first request message could include, without limitation, to one or more of the following information:
- an application identity used by the other UE in the first D2D data session;
- a ProSe Application Code used by the other UE in the first D2D data session;
- an identity of the other UE in the first D2D data session; and/or
- a service type or a QoS (Quality of Service) of the first D2D data session.

In one embodiment, as shown in step 810, the UE receives a first response message from the WCN, wherein the first response message includes resource information that indicates dedicated resource for the first D2D data session. More specifically, the first response message could include a configuration of the dedicated resource, and/or a configuration of scheduling assignment (SA). In particular, the SA could be associated with a validity time.

In one embodiment, as shown in step 815, the UE transmits a second request message to the WCN for establishing a second D2D data session. More specifically, the second request message is transmitted to the WCN before the end of the first D2D data session. In particular, the second request message could include, without limitation, one or more of the following information:
- an application identity used by the other UE in the second D2D data session;
- a ProSe Application Code used by the other UE in the second D2D data session;
- an identity of the other UE in the second D2D data session; and/or
- a service type or a QoS (Quality of Service) of the second D2D data session.

In one embodiment, as shown in step 820, the UE receives a second response message from the WCN, wherein the second response message includes resource information that indicates at least one common resource pool for the second D2D data session. More specifically, the second response message could include a configuration of scheduling assignment (SA). In particular, the SA could be associated with a validity time.

In one embodiment, the resource information could be an indicator indicating either dedicated resource or common resource is allocated for a D2D data session. More specifically, the dedicated resource is a resource in a dedicated resource pool. In particular, the dedicated resource could be associated with a validity time. More specifically, the resource is radio resource that could include time resource and/or frequency resource.

As described above, the UE uses dedicated resource for the first D2D data session and uses common resource for the second D2D data session. More specifically, the second D2D data session is established before the end of the first D2D data session. In another embodiment, the UE uses common resource for the first D2D data session and uses dedicated resource for the second D2D data session. And, the second D2D data session is established before the end of the first D2D data session. More specifically, the UE uses common resource by selecting a resource from the at least one common resource pool in the second response message for transmitting data belonging to the second data session.

Referring back to FIGS. 3 and 4, the device 300 includes a program code 312 stored in memory 310 of a UE. The CPU 308 could execute program code 312 to enable the UE to use dedicated resource for a first D2D data session and to use common resource for a second D2D data session, wherein the second D2D data session is established before the first D2D data session ends. Furthermore, the CPU 308 could execute program code 312 to enable the UE to transmit a request message to a WCN for establishing a D2D data session. The CPU 308 could also execute program code 312 to enable the UE to receive a response message from the WCN, wherein the response message includes resource information that indicates which kind of resource is allocated for the D2D data session.

In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for allocating resources for device-to-device (D2D) communication, comprising:
   allocating, by a wireless communication network (WCN), dedicated resource to a user equipment (UE) for a first D2D data session; and
   allocating, by the WCN, common resource to the UE for a second D2D data session before the first D2D data session ends.

2. The method of claim 1, further comprising:
   the WCN receives a first request message from the UE for establishing the first D2D data session.

3. The method of claim 1, further comprising:
   the WCN receives a second request message from the UE for establishing the second D2D data session.

4. The method of claim 2, further comprising:
   the WCN transmits a first response message to the UE in response to reception of the first request message, wherein the first response message includes resource information that indicates the dedicated resource for the first D2D data session.

5. The method of claim 3, further comprising:
   the WCN transmits a second response message to the UE in response to reception of the second request message, wherein the second response message includes resource information that indicates at least one common resource pool for the second D2D data session.

6. The method of claim 2, wherein the first request message includes an identity of another UE associated with the first D2D data session.

7. The method of claim 4, wherein the first response message includes a configuration of scheduling assignment (SA).

8. The method of claim 1, wherein the dedicated resource is a resource in a dedicated resource pool.

9. The method of claim 3, wherein the second request message includes an identity of another UE associated with the second D2D data session.

10. A method for allocating resources for device-to-device (D2D) communication, comprising:
    using, by a user equipment (UE), dedicated resource for a first D2D data session; and
    using, by the UE, common resource for a second D2D data session, wherein the second D2D data session is established before the first D2D data session ends.

11. The method of claim 10, further comprising:
    the UE transmits a first request message to a wireless communication network (WCN) for establishing the first D2D data session.

12. The method of claim 10, further comprising:
    the UE transmits a second request message to a WCN for establishing the second D2D data session.

13. The method of claim 11, further comprising:
    the UE receives a first response message from the WCN, wherein the first response message includes resource information that indicates the dedicated resource for the first D2D data session.

14. The method of claim 12, further comprising:
    the UE receives a second response message from the WCN, wherein the second response message includes resource information that indicates at least one common resource pool for the second D2D data session.

15. The method of claim 11, wherein the first request message includes an identity of another UE associated with the first D2D data session.

16. The method of claim 13, wherein the first response message includes a configuration of scheduling assignment (SA).

17. The method of claim 10, wherein the dedicated resource is a resource in a dedicated resource pool.

18. The method of claim 12, wherein the second request message includes an identity of another UE associated with the second D2D data session.

19. A wireless communication network (WCN) for allocating resources for device-to-device (D2D) communication, comprising:

a control circuit;
a processor installed in the control circuit; and
a memory installed in the control circuit and operatively coupled to the processor;
wherein the processor is configured to execute a program code stored in the memory to:
  allocate dedicated resource to a user equipment (UE) for a first D2D data session; and
  allocate common resource to the UE for a second D2D data session before the first D2D data session ends.

20. The WCN of claim 19, wherein the WCN receives a first request message from the UE for establishing the first D2D data session.

21. The WCN of claim 19, wherein the WCN receives a second request message from the UE for establishing the second D2D data session.

22. The WCN of claim 20, wherein the WCN transmits a first response message to the UE in response to reception of the first request message, wherein the first response message includes resource information that indicates the dedicated resource for the first D2D data session.

23. The WCN of claim 21, wherein the WCN transmits a second response message to the UE in response to reception of the second request message, wherein the second response message includes resource information that indicates at least one common resource pool for the second D2D data session.

24. The WCN of claim 20, wherein the first request message includes an identity of another UE associated with the first D2D data session.

25. The WCN of claim 22, wherein the first response message includes a configuration of scheduling assignment (SA).

26. The WCN of claim 19, wherein the dedicated resource is a resource in a dedicated resource pool.

27. The WCN of claim 21, wherein the second request message includes an identity of another UE associated with the second D2D data session.

28. A user equipment (UE) for allocating resources for device-to-device (D2D) communication, comprising:
a control circuit;
a processor installed in the control circuit; and
a memory installed in the control circuit and operatively coupled to the processor;
wherein the processor is configured to execute a program code stored in the memory to:
  use dedicated resource for a first D2D data session; and
  use common resource for a second D2D data session, wherein the second D2D data session is established before the first D2D data session ends.

29. The UE of claim 28, wherein the UE transmits a first request message to a wireless communication network (WCN) for establishing the first D2D data session.

30. The UE of claim 28, wherein the UE transmits a second request message to a WCN for establishing the second D2D data session.

31. The UE of claim 29, wherein the UE receives a first response message from the WCN, wherein the first response message includes resource information that indicates the dedicated resource for the first D2D data session.

32. The UE of claim 30, wherein the UE receives a second response message from the WCN, wherein the second response message includes resource information that indicates at least one common resource pool for the second D2D data session.

33. The UE of claim 29, wherein the first request message includes an identity of another UE associated with the first D2D data session.

34. The UE of claim 31, wherein the first response message includes a configuration of scheduling assignment (SA).

35. The UE of claim 28, wherein the dedicated resource is a resource in a dedicated resource pool.

36. The UE of claim 30, wherein the second request message includes an identity of another UE associated with the second D2D data session.

* * * * *